US007895723B2

(12) United States Patent
Wridt et al.

(10) Patent No.: US 7,895,723 B2
(45) Date of Patent: Mar. 1, 2011

(54) JOINT PRESS SET

(75) Inventors: Gerald A. Wridt, Racine, WI (US); Daniel D. Lionberg, Wilwaukee, WI (US); Thomas J. Whalen, Pleasant Prairie, WI (US)

(73) Assignee: Snap-on Incorporated, Kenosha, WI (US)

( * ) Notice: Subject to any disclaimer, the term of this patent is extended or adjusted under 35 U.S.C. 154(b) by 1338 days.

(21) Appl. No.: 10/950,066

(22) Filed: Sep. 24, 2004

(65) Prior Publication Data

US 2006/0070221 A1 Apr. 6, 2006

(51) Int. Cl.
*B23P 19/02* (2006.01)

(52) U.S. Cl. .............................. 29/257; 29/255; 269/143

(58) Field of Classification Search .................... 29/257, 29/249, 255, 278; 269/143, 248–249
See application file for complete search history.

(56) References Cited

U.S. PATENT DOCUMENTS

| | | | | |
|---|---|---|---|---|
| 1,380,071 | A * | 5/1921 | Marzyck | 81/13 |
| 1,412,961 | A * | 4/1922 | Periolat | 81/3.7 |
| 1,498,638 | A * | 6/1924 | Periolat | 269/47 |
| 3,102,333 | A | 9/1963 | Thornton et al. | |
| 3,237,291 | A | 3/1966 | Kelso | |
| 3,651,553 | A | 3/1972 | Dodd | |
| 3,696,496 | A | 10/1972 | Corder | |
| 3,745,637 | A | 7/1973 | Rutherford et al. | |
| 3,786,544 | A | 1/1974 | Ferguson | |
| 3,791,006 | A | 2/1974 | Robinson | |
| 3,862,483 | A | 1/1975 | Kloster | |
| 3,942,234 | A | 3/1976 | Kepler | |
| 4,120,082 | A | 10/1978 | Bond | |
| 4,558,502 | A | 12/1985 | Gossmann et al. | |
| 4,570,319 | A | 2/1986 | Skoworodko | |
| 4,649,615 | A | 3/1987 | Hundley | |
| 4,658,488 | A | 4/1987 | Johnstead | |
| 4,977,660 | A | 12/1990 | Maynard | |
| 5,490,432 | A | 2/1996 | Allard et al. | |
| 5,781,977 | A | 7/1998 | Servones | |
| 5,836,078 | A | 11/1998 | Aiken et al. | |
| 5,857,252 | A * | 1/1999 | Jansen | 29/257 |
| 6,035,533 | A | 3/2000 | Warnke et al. | |
| 6,131,262 | A | 10/2000 | Freimann | |
| 6,431,534 | B1 * | 8/2002 | Orosz et al. | 269/43 |
| 6,701,594 | B2 * | 3/2004 | Bruyn | 29/257 |
| 7,610,664 | B2 * | 11/2009 | Wridt et al. | 29/257 |
| 7,669,305 | B1 * | 3/2010 | Lionberg | 29/257 |
| 2006/0070221 | A1 * | 4/2006 | Wridt et al. | 29/281.1 |

* cited by examiner

*Primary Examiner* — Lee D Wilson
(74) *Attorney, Agent, or Firm* — Seyfarth Shaw LLP

(57) ABSTRACT

A joint press including a yoke including a first end and a second end. A first adapter attachment member is positioned on the first end. A second adapter attachment member is positioned on the second end. The first adapter attachment member and the second adapter attachment member have the same profile, thereby allowing the same adapter to be removably connected to either the first end or the second end.

46 Claims, 3 Drawing Sheets

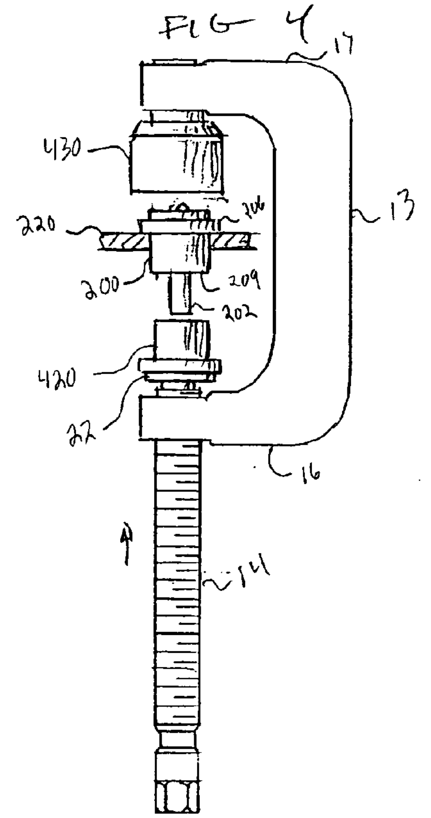
FIG 4
17
430
13
220
206
200
209
202
420
22
16
14
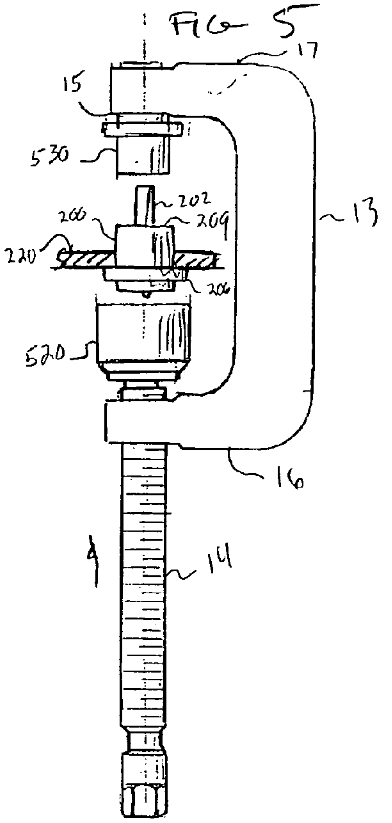
FIG 5
17
15
530
202
200
209
13
220
206
520
16
14
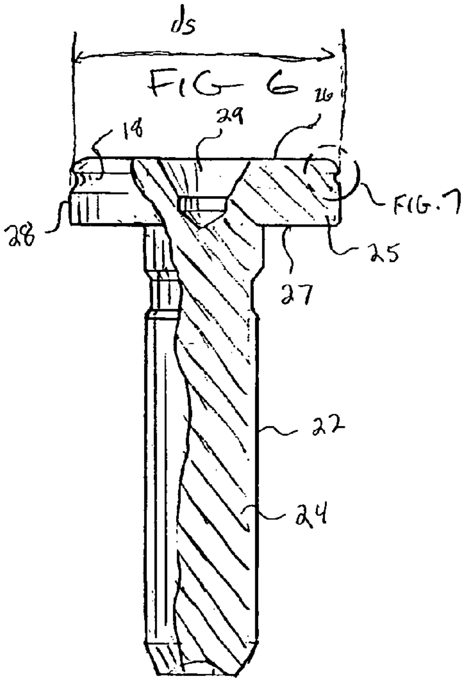
ds
FIG 6
18
29
26
28
FIG. 7
25
27
22
24
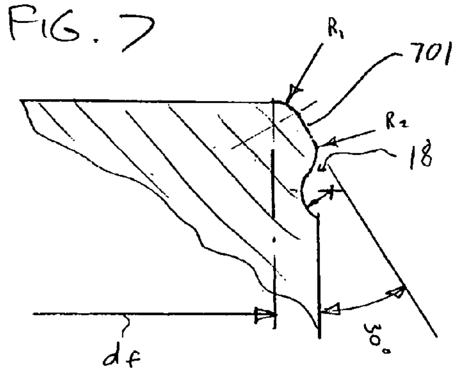
FIG. 7
R1
701
R2
18
df
30°
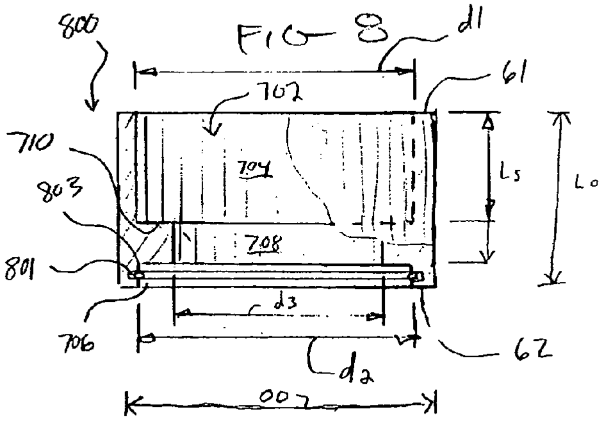
800
FIG 8
d1
61
702
710
704
Ls
Lo
803
708
801
d3
706
62
d2
OD2

JOINT PRESS SET

BACKGROUND

People who service automobiles use joint press kits to install and remove joints, such as press-in ball joints and universal joints, of vehicle suspensions. A joint press kit often includes several adapters. The adapters typically fall into two categories. "Push" adapters bear against joints to drive them in a particular direction, e.g. into or out of a vehicle suspension, while "receiver" adapters bear against the vehicle suspension and receive a joint as it is pushed. Thus, the push adapter and the receive adapter cooperate to force the joint either into or out of a vehicle suspension.

Adapters are typically made to service a particular type of joint. The size and the shape of an adapter are tailored to the characteristics of the joint that it is meant to service. For example, a narrow ball joint requires a correspondingly narrow push adapter and can operate effectively with a wide number of receive adapters provided they are wider than the joint. There are many different sizes and shapes of ball joints. Accordingly, for a joint press kit to provide comprehensive coverage, it must include a correspondingly large number of adapters.

This presents a problem, however, because as the number of ball joint types increase, the cost of providing a larger number of adapters becomes prohibitive from a cost, time, and storage standpoint. Further, despite having a large number of adapters, the press kit might still not cover all the possible ball joints. Accordingly, what is needed is a joint press kit in which the number of adapters is optimized to provide the broadest possible coverage of the ball joints on the market.

A second difficulty with joint press kits is they are not adaptable for use in a wide variety of vehicles. One make of vehicle may require installation of an upper ball joint by providing downward force, whereas another vehicle may require upward force. Therefore, what is needed is a joint press kit that may be used in many different configurations.

A third difficulty with joint press kits is they do not provide an accommodation for the grease fitting during the removal and installation of ball joints. The grease fitting is located on the side opposite the stem side of a ball joint. The grease fitting can not be present during installation and removal operations because it will interfere with the operation of the joint press. Thus, prior to removal of a ball joint, the grease fitting must be removed. Further, during installation of a ball joint, the grease fitting can only be added after the ball joint is securely placed in the suspension. These operations are often difficult to perform. Accordingly, there is a need for a joint press that allows a user to install or remove a ball joint while the grease fitting is in place.

A fourth difficulty with joint press kits is that the adapters do not always attach to the press easily or effectively. For example, if a kit requires that the adapters be screwed onto the pressure screw, this consumes valuable time. On the other hand, if the adapters can attach to the pressure screw quickly, they might not be effectively secured. Therefore, what is needed is a device for efficiently and effectively attaching ball joint adapters to the press.

A fifth problem with ball joint kits relates to the length of the adapters. Often, it may be desirable to use an adapter having a particular width to perform a removal or an installation operation. Yet, if the adapter is not long enough to bear against the vehicle suspension it is unusable. Therefore, what is needed is an adapter extension to impart usefulness to otherwise unusable adapters.

SUMMARY

In one embodiment, a joint press is provided. The joint press includes a yoke having a first end and a second end. A first adapter attachment member is positioned on the first end. A second adapter attachment member is positioned on the second end. The first adapter attachment member and the second adapter attachment member have the same profile, thereby allowing the same adapter to be removably connected to either the first end or the second end.

In another embodiment, a joint press is provided. The joint press includes a yoke having a first end and a second end. A first attachment member is located on the first end. A second attachment member is located on the second end. At least one adapter is provided that can be removably coupled to either the first attachment member or the second attachment member.

In a further embodiment, a joint press is provided. The joint press includes a yoke having a first end and a second end. A first adapter attachment member is positioned on the first end. A second adapter attachment member is positioned on the second end. Plural adapters are provided, each having a first end adapted to receive a joint and a second end that is adapted to be attached to either the first attachment member or the second attachment member.

In yet another embodiment, a device for attaching an adapter to a joint press is provided. The device includes a sleeve having an interior surface and an exterior surface, wherein the sleeve is part of the adapter. An interior groove is positioned on the interior surface of the sleeve. A snap-ring having a transverse circular cross-section is positioned in the interior groove. The snap-ring floats within the groove. A shaft having an exterior surface is part of the joint press. An exterior groove is positioned on the exterior surface of the shaft. The snap ring engages the exterior groove when the shaft and the sleeve are mated.

In a further embodiment, a pressure pad for a ball joint press is provided. The pressure pad includes a shaft and an engagement portion attached to the shaft. The engagement portion includes a recess that is adapted to receive a ball joint grease fitting.

BRIEF DESCRIPTION OF THE DRAWINGS

FIG. 4 is side elevation view of the joint press of FIG. 1 shown in an exemplary configuration for removing a ball joint.

FIG. 5 is a side elevation view of the joint press of FIG. 1 shown in a second exemplary configuration for removing a ball joint.

FIG. 6 is an enlarged cut away view of the ball joint pressure pad shown in the joint press kit of FIG. 1.

FIG. 7 is an enlarged fragmentary view of the encircled portion of the pressure pad of FIG. 6.

FIG. 8 is an enlarged cut away view of an exemplary joint adapter of the kit of FIG. 1.

DETAILED DESCRIPTION

Figure 1:
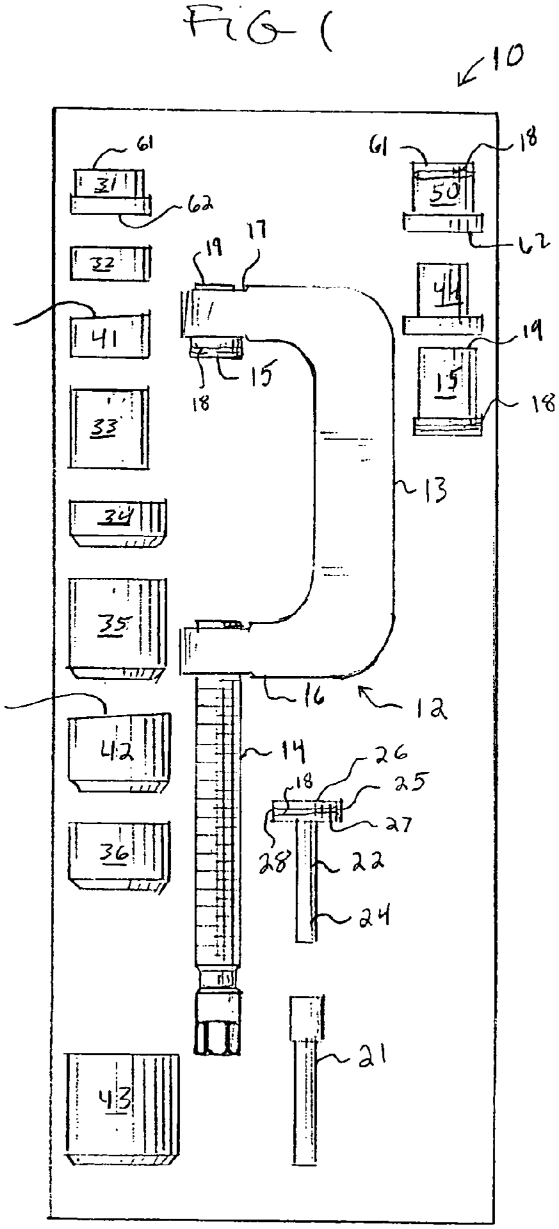
FIG. 1 is a side elevation view of joint press kit including a press, a plurality of pressure pads, and a plurality of adapters.

Referring to FIG. 1, a joint press kit 10 in one example comprises a press 12, a universal joint pressure pad 21, a ball joint pressure pad 22, a plurality of dual-use adapters 31, 32, 33, 34, 35, 36, a plurality of single-use adapters 41, 42, 43, 44, and an adapter extension 50. The components of the joint press kit 10 can be made of any material suitable for performing its intended function of installing and removing joints from vehicle suspensions. Exemplary materials include, but are not limited to alloy steels such as SAE 4140, SAE 8640, SAE 52100, and music wire.

Press 12, in one example, comprises a yoke 13, a pressure screw 14, and an adapter attachment shaft 15. Pressure screw 14 is positioned in a threaded opening (see FIG. 2) located at a first end 16 of yoke 13. Adapter attachment shaft 15 is positioned in an opening (see FIG. 2) located at a second end 17 of yoke 13.

Pressure screw 14 is at least partially hollow and includes an opening on one end. As will be discussed further herein, either of pressure pads 21, 22 (see FIG. 2) can be inserted into an opening located at an end of pressure screw 14. Pressure pads 21, 22 can then be utilized for installation and removal operations for universal joint bearing caps and ball joints, respectively.

Adapter attachment shaft 15 and pressure pad 22 act as adapter attachment members to which the various adapters can be connected to perform an installation or removal operation. Adapter attachment shaft 15 and pressure pad 22 both include an external circumferential groove 18. External groove 18 mates with a corresponding internal circumferential groove, containing a snap-ring, which is located within each adapter to attach the adapter to either shaft 15 or pressure pad 22. Alternatively, other means, such as friction fits or various threaded configurations, could be used to attach the adapters to attachment shaft 15 or pressure pad 22. The connection between these parts is discussed further herein.

Adapter attachment shaft 15, for exemplary purposes, is shown both positioned in the opening at end 17 of yoke 13 and to the side of yoke 13. Adapter attachment shaft 15 is connected to yoke 13 by placing end 19 into the opening on end 17 of yoke 13. Adapter attachment shaft 15 could be secured to yoke 13 through a variety of means. For example, shaft 15 could have an external groove that mates with an internal groove and snap-ring located in yoke 15. Alternatively, another means, such as a friction fit or threaded engagement could be used. Adapter attachment shaft 15 is at least partially hollow and in the illustrated embodiment is tubular to allow a ball joint stud to pass within it during a removal or installation operation.

Ball joint pressure pad 22 includes a shaft 24 and an engagement portion 25. The engagement portion 25 is cylindrical and includes a first base surface 26, a second base surface 27, and a sidewall 28. External groove 18 is located on the sidewall 28 of engagement portion 25. Base surface 26 in one example is flat and can be utilized to engage a ball joint. Base surface 27 is connected to shaft 22.

The dual-use adapters 31-36 are designed to function as both "push" adapters and "receive" adapters. Single-use adapters 41-44 are designed to perform only one function, either pushing or receiving. Each of the adapters has a first end 61 for engaging a joint, either through pushing or receiving, and a second end 62 that connects to adapter attachment shaft 15 or to pressure pad 22. Adapters 31-36 and adapters 43, 44 are basic cylindrical adapters. Adapters 41, 42 include have an angled surface 39 at end 61 for engaging an angled suspension member.

Adapter extension 50, as will be discussed herein, is stackable with respect to the other adapters. Thus, adapter extension 50 can increase the effective length of the other adapters. Adapter extension 50 includes external groove 18 for mating with the snap ring the other adapters.

In another example, a common grease fitting that installs by way of threaded interface, is installed in a radially drilled hole in the yoke 13 generally at the end 16 that includes the internally threaded opening in which the pressure screw 14 is positioned. The threaded bore in which the grease fitting mounts begins at a location on the yoke 13 such that when the grease fitting is installed it is not prone to being damaged by contact with external objects during use. This bore continues through the solid forging of the yoke 13, breaking into the larger, internally threaded pressure screw bore mentioned above.

Figure 2:
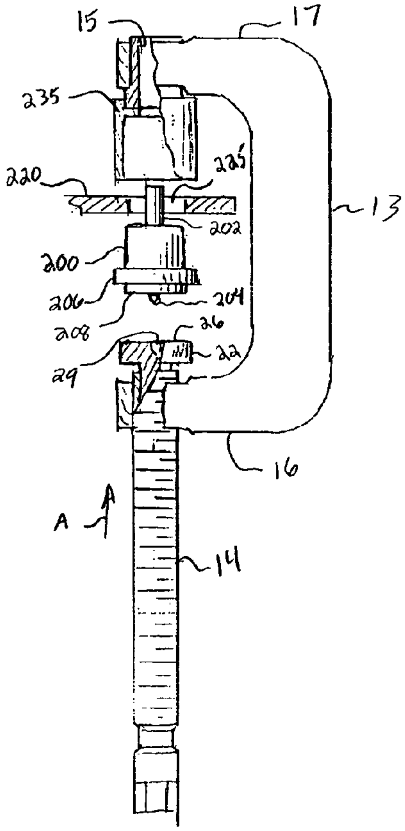
FIG. 2 is a side elevation view of the joint press kit of FIG. 1 shown partially cut away and in an exemplary configuration operable to insert a ball joint into a suspension.
Figure 3:
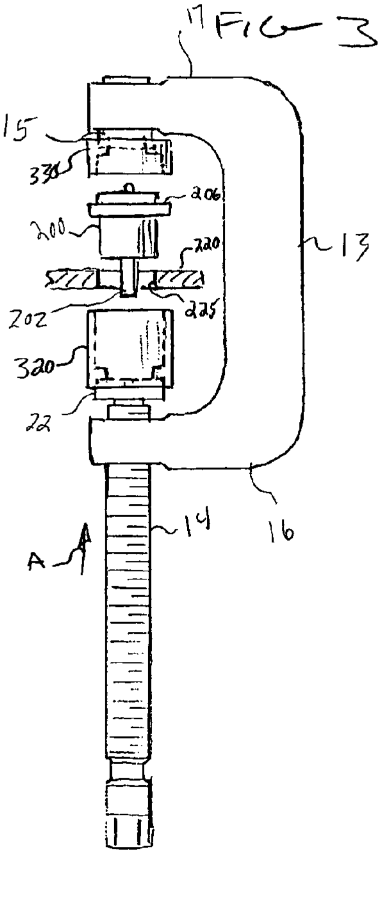
FIG. 3 is a side elevation view of the joint press kit of FIG. 1 shown in another exemplary configuration for installing a ball joint into a suspenson.

Referring to FIGS. 2-4, a typical ball joint 200 includes a stem 202, a grease fitting 204, a flange 206, and a surface 208 against which pressure pad 22 can push. The ball joint 200 is typically installed into an opening in a portion of an automobile suspension (e.g. control arm, axle, knuckle, etc.). FIGS. 2-4 depict this portion of the automobile suspension as item 220 and the opening as 225.

Ball joints typically install either in the direction of the stem 202 or in a direction opposite the stem 202. FIGS. 2-4 depict a ball joint 200 that is installed in the stemwise direction and removed in the counterstemwise direction.

For brevity, the drawing depicts press kit 10 in operations with a ball joint that installs in the stemwise direction. As those with skill in the art would understand, joint press kit 10 will also function with ball joints that install in the counterstemwise direction.

Referring now to FIG. 2, in one example, the joint press kit 10 is configured to install ball joint 200 into the suspension 220, by positioning the pressure screw 14 and ball joint pressure pad 22 on the side of ball joint 200 that grease fitting 204 is located on. In the operation depicted in FIG. 2, pressure pad 22 is used to push ball joint 220. If necessary, an adapter could be placed on pressure pad 22.

Referring to FIGS. 2 and 6, pressure pad 22 includes a recess 29 located on surface 26. Recess 29 is shaped and dimensioned to receive grease fitting 204. Accordingly, pressure pad 22 can be brought to bear against surface 208 of ball joint 200 while the grease fitting 204 is in place.

Referring now to FIG. 2, to install the ball joint, pressure pad 22 is brought to bear against surface 208 of ball joint 200. On the opposite end 17 of yoke, an adapter 235 is positioned on attachment shaft 15. Adapter 235 can be any adapter capable of acting as a receiver. Table 1 provides a list of the adapters shown in FIG. 1 and identifies each as a receiver, a pusher, or dual use. It should be noted that all of the adapters in Table 1 are adapted to fit on both receive shaft 15 and pressure pad 22.

TABLE 1

| Number | Function |
|---|---|
| 31 | Dual |
| 32 | Dual |
| 33 | Dual |
| 34 | Dual |

TABLE 1-continued

| Number | Function |
|---|---|
| 35 | Dual |
| 36 | Dual |
| 41 | Receiving |
| 42 | Receiving |
| 43 | Receiving |
| 44 | Pushing |
| 50 | Extension |

Whether an adapter is placed on pressure pad 22 depends on the geometry of the ball joint 200 and the configuration of the vehicle suspension. Similarly, the choice of adapter to place on attachment shaft 15 depends on the geometry of ball joint 200 and the configuration of the vehicle suspension. The particular mechanic performing the operation will decide after analyzing both the ball joint 200 and the suspension.

To install ball joint 200, pressure screw 14 is turned so that pressure pad 22 advances in direction A. Surface 26 of pressure pad 22 will eventually contact surface 208 of ball joint 200 and adapter 235 will bear against suspension 222. As the pressure screw 14 continues to be turned, adapter 235 will provide an opposing force against which pressure pad 22 pushes to drive ball joint 200 into opening 225. Stem 202 of ball joint will enter the bore of adapter 235. Accordingly, as will be discussed further herein through bore of adapter 235 must be large enough to accommodate the ball joint stem 202. Ball joint will stop advancing when flange 206 contacts suspension 220.

Referring to FIG. 3, an insertion operation is shown in which the orientation of yoke 13 relative to the ball joint 200 is reversed as compared to FIG. 2. This might be necessary for certain vehicles. For instance, if there is no room to apply a wrench to the end of pressure screw 14 using the configuration of FIG. 2, then the configuration of FIG. 3 might be desirable.

In FIG. 3, pressure pad 22 has a receiver 320 attached and attachment shaft 15 has a push adapter 330 attached. Once again pressure screw 14 is turned to advance adapter 320 toward suspension 220. At a certain point, adapter 320 will bear against suspension 220 while adapter 330 bears against flange 206 of ball joint 200. As pressure screw 14 turns, stem 202 of ball joint 200 will enter the bore of adapter 320 and adapters 320, 330 will squeeze ball joint 200 into opening 225.

FIG. 4 depicts a removal operation. Ball joint 200 is shown attached to suspension 220. An adapter 420 is attached to pressure pad 22 and an adapter 430 is attached to attachment shaft 15. Once again adapters 420, 430 are chosen according to the geometry of ball joint 200 and suspension 220. Adapter 420 acts as a push adapter and adapter 430 acts as a receive adapter. As pressure screw 14 turns, stem 202 enters the bore of adapter 420, and adapter 420 eventually bears against surface 209 of ball joint 200. Meanwhile, adapter 430 surrounds flange 206 of ball joint 200 and bears against suspension 220. As pressure screw 14 continues to turn, adapter 430 pushing against suspension 220 provides push adapter 420 with an opposing force against which it pushes to expel ball joint 200 from suspension 220.

Referring to FIG. 5, a removal operation is shown in which the orientation of yoke 13 relative to ball joint 200 is reversed. Receive adapter 520 is positioned on pressure pad 22 and push adapter 530 is positioned on attachment shaft 15. As pressure screw 14 advances adapter 520, adapter 520 surrounds flange 206 of ball joint 200 and bears against suspension 220. Meanwhile, stem 202 enters the bore of push adapter 530, which then bears against surface 209 of ball joint 200. As pressure screw 14 turns, adapter 530 pushes ball joint 200 out of suspension 220.

Referring to FIGS. 1 and 6, as was stated earlier, pressure pad 22 comprises shaft 24 and engagement portion 25. Engagement portion 25 is cylindrical and includes first base surface 26, second base surface 27, and sidewall 28. Circumferential groove 18 is positioned on sidewall 28. In addition, engagement portion 25 has outer diameter ds. In one example, end 19 of attachment shaft 15 and end 61 of adapter extension 50 include the identical profile as engagement portion 25. In other words, end 19 of attachment shaft 15 and end 61 of extension 50 are cylindrical, have the same outer diameter ds, and include circumferential groove 18 positioned on the sidewall of their cylindrical surfaces; thus, providing attachment shaft 15, pressure pad 22, and extension 50 with an identical interface for mating with the adapters. In one example ds is 1.645 inches.

Referring to FIG. 8, an exemplary adapter 800 is shown for illustrative purposes to describe certain features that are common to all of the adapters of FIG. 1. The characteristics of adapter 800 depend on the particular adapter of FIG. 1 that adapter 800 represents. Each adapter includes a first end 61 and second end 62. First end 61 either pushes against a ball joint or receives a ball joint. End 62 is the end that is connected to adapter attachment shaft 15, pressure pad 22, or adapter extension 50. Each adapter includes a bore 702 which runs from first end 611 to second end 62. Bore 702 includes three portions. The first portion 704 is adapted to receive or engage a ball joint. The second portion 706 is adapted to receive end 19 of attachment shaft 15, engagement portion 25 of pressure pad, and end 61 of adapter 50. Portion 708 is a through portion that communicates with portions 704 and 706. The intersection of portion 706 and portion 708 provides a ledge or ridge 710 against which adapter receive shaft 15, pressure pad 22, or extension 50 push when press kit 10 is in use.

As will be further discussed herein, second portion 706 of each adapter includes a groove 801 in which a snap ring 803 is positioned. When pressure pad attachment shaft 15, pressure pad engagement portion 25, or end 61 of extension 50 are inserted into portion 706, groove 18 mates with groove 801 and snap ring 803 engages both grooves 18, 801, thereby holding the pieces together.

First portion 704 has a diameter $d_1$. Diameter $d_1$ varies according to the particular adapter. The values of d1 are chosen so kit 10 will cover the largest number of ball joints possible. The diameter $d_1$ for each adapter shown in FIG. 1 is provided in Tables 2 and 3.

TABLE 2

| Cylindrical Adapters | | | | | | |
|---|---|---|---|---|---|---|
| ADAPTER | d1 | OD | bore depth | d3 | Ls | Lo |
| 31 | 1.680 | 1.890 | 0.650 | 1.250 | 0.830 | 1.100 |
| 32 | 1.775 | 2.000 | 0.550 | 1.250 | 0.730 | 1.000 |
| 33 | 2.010 | 2.250 | 1.700 | 1.250 | 1.880 | 2.150 |
| 34 | 2.250 | 2.500 | 0.670 | 1.250 | 0.850 | 1.120 |
| 35 | 2.250 | 2.500 | 2.300 | 1.250 | 2.480 | 2.750 |
| 36 | 2.425 | 2.750 | 1.250 | 1.250 | 1.430 | 1.700 |
| 43 | 2.680 | 2.937 | 2.300 | 1.250 | 2.480 | 2.750 |
| 44 | 0.895 | 1.330 | 1.550 | 0.895 | 1.400 | 1.820 |
| 50 | 1.250 | 1.645 | 1.780 | 1.250 | 1.650 | 2.050 |

TABLE 3

| Special Shaped Adapters | | | | | | | | |
|---|---|---|---|---|---|---|---|---|
| ADAPT-ER | d1 | OD | MAX. bore depth | d3 | Face angle | Ls | cutout or angle? | Lo |
| 41 | 1.845 | 2.000 | 0.800 | 1.250 | 4.500 | 0.980 | Angle | 1.250 |
| 42 | 2.350 | 2.650 | 1.700 | 1.250 | 4.500 | 1.880 | Angle | 2.150 |

Second portion 706 has a diameter $d_2$. Diameter $d_2$ does not vary for the respective adapters. In one example, $d_2$ is 1.656 inches for each adapter. Third portion 708 has a diameter $d_3$ that also does not vary from adapter to adapter. In one example, diameter $d_3$ is 1.25 inches, which is large enough to allow passage of the largest known ball joint stud 202 (FIGS. 2-5) to pass through the adapter. FIG. 8 also illustrates an outer diameter (OD) of adapter 800, an overall length (Lo) of adapter 800, and a stack length (Ls) of adapter. Exemplary values of these lengths for each adapter of FIG. 1 are provided in tables 2 and 3.

Figure 9:
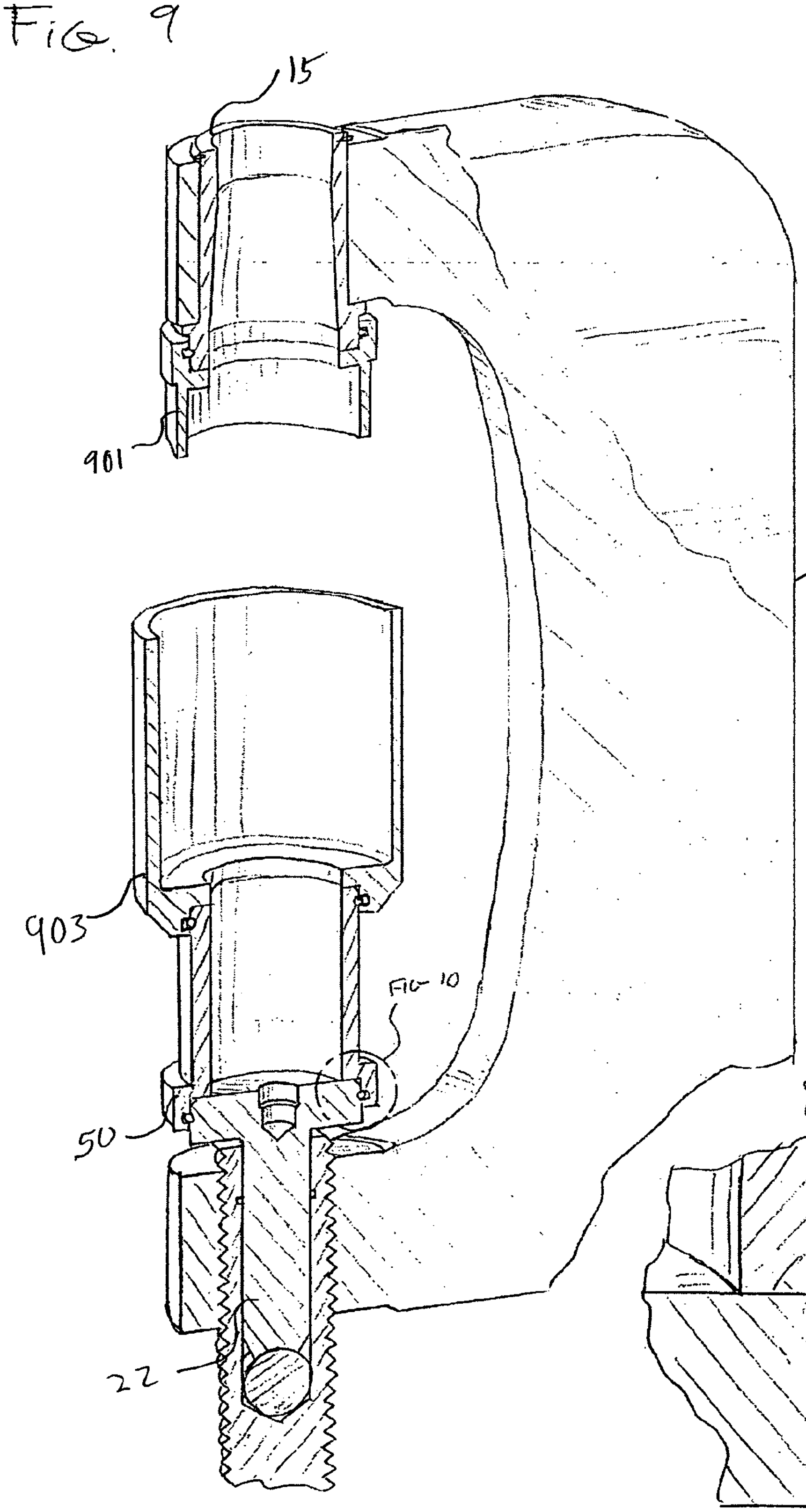
FIG. 9 is an enlarged, fragmentary, perspective view of the joint press kit of FIG. 1 shown in an exemplary configuration utilizing the adapter extension, with portions of the yoke, pressure screw, pressure pad, and adapters cut away.
Figure 10:
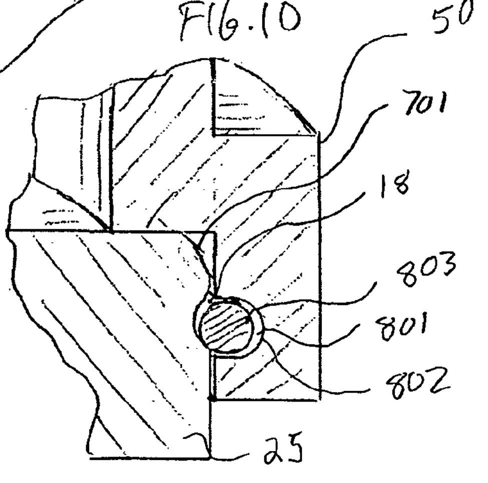
FIG. 10 is a further enlarged fragmentary view of the encircled portion of FIG. 9.

FIGS. 9-10 depict an exemplary configuration in which an adapter 901 is connected to attachment shaft 15, an adapter 903 is connected to extension 50, and extension 50 is connected to pressure pad 20 utilizing grooves 18, 801 and snap-ring 803. Referring to FIG. 10, it can be seen that the mechanism functions because snap-ring 803 is allowed to “float” within groove 803 when the pieces are not connected. By “float” it is meant that snap-ring 803 does not contact the bottom 802 of groove 801 when the piece is disconnected. Further, groove 801 has sufficient width to allow snap ring to 803 to move within groove 801. Accordingly, when shaft 15, pressure pad 22, or extension 50 are inserted into the receiving portion of the adapter, tapered portion 701 of the shaft 15 (see FIG. 7), pressure pad 22, or extension 50 abuts snap ring 803 and causes it to expand into groove 801. Eventually, as the pieces are brought closer together, snap-ring 803 will reside in both groove 18 and groove 801, thereby causing the pieces to mate. It is important that groove 801 is large enough for snap-ring 803 to float, but not large enough that snap-ring becomes off-center within the adapter. Exemplary dimensions of adapter features discussed herein are as follows: Groove 801 features a major inner diameter of 1.821", and a full-compliment radius and width of 0.088". Snap-ring 803 has an inner diameter of 1.621 and a wire gauge of 0.080"

Referring to FIG. 7, it is also important that the groove 18 and taper 701 be formed correctly on the exterior surface of attachment shaft 15, pressure pad 25, and extension 50. In one of these examples, taper 701 is a lead-in taper of 30 degrees, formed to have a lead-in radius R1 of 0.047" beginning at diameter df of 1.514", and a lead-out radius R2 of 0.047".

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

The invention claimed is:

1. A joint press, comprising;
- a yoke including a first end and a second end;
- a first adapter attachment member connectable with the first end; and
- a second adapter attachment member connectable with the second end, wherein each of the first adapter attachment member and the second adapter attachment member has substantially identical connecting structure for selectively connecting with a single adapter, thereby allowing the single adapter to be removably connected to either the first end or the second end.

2. The joint press of claim 1, wherein the first end and the second end define a space therebetween, and the first adapter attachment member and the second adapter attachment member project into the space when connected with the ends.

3. The joint press of claim 2, wherein the yoke has a substantially C-shape.

4. The joint press of claim 1, wherein the yoke includes a first opening located at the first end and a second opening located at the second end.

5. The joint press of claim 1, further comprising a first opening in the first end, and a screw positioned in the first opening, wherein the first adapter attachment member is coupled to the screw.

6. A joint press, comprising;
- a yoke including a first end, a second end, a first opening located at the first end and a second opening located at the second end;
- a first adapter attachment member positioned on the first end, wherein the first adapter attachment member is a ball joint pressure pad;
- a screw positioned in the first opening, wherein the first adapter attachment member is coupled to the screw; and
- a second adapter attachment member positioned on the second end, wherein the first adapter attachment member and the second adapter attachment member have substantially identical connecting structure for selectively connecting with a single adapter, thereby allowing an adapter to be removably connected to either the first or the second adapter attachment member.

7. The joint press of claim 6, wherein the ball joint pressure pad comprises an engagement portion and a shaft connected to the engagement portion, and the screw is at least partially hollow for receiving the shaft therein.

8. The joint press of claim 7, wherein the engagement portion includes a first base, a second base, and a cylindrical sidewall.

9. The joint press of claim 8, wherein the first base is attached to the shaft and the second base is engageable with a ball joint.

10. The joint press of claim 9, further comprising a recess located on the second base, wherein the recess is configured to receive a ball joint grease fitting.

11. The joint press of claim 8 wherein the cylindrical sidewall includes a circumferential groove, and the ball joint pressure pad includes a snap-ring located in the circumferential groove.

12. The joint press of claim 4, wherein the second adapter attachment member includes a shaft positioned in the second opening.

13. The joint press of claim 12, wherein the shaft is cylindrical.

14. The joint press of claim 13, further comprising a circumferential groove positioned on the shaft, the circumferential groove configured to receive a snap-ring of an adapter.

15. A joint press, comprising:
- a yoke including a first end and a second end;
- a first attachment member located on the first end,
- a second attachment member located on the second end; and
- at least one adapter that can be removably coupled to either the first attachment member or the second attachment member.

16. The joint press of claim 15, wherein the first end and the second end define a space therebetween.

17. The joint press of claim 16, wherein the first attachment member and the second attachment member extend opposite each other into the space.

18. The joint press of claim 17, wherein the yoke has a substantially C shape.

19. The joint press of claim 15, further comprising a first opening located on the first end and a second opening located on the second end.

20. The joint press of claim 19, further comprising a screw positioned in the first opening, wherein the first attachment member is coupled to the screw.

21. The joint press of claim 20, wherein the screw is at least partially hollow, and at least a portion the first attachment member is positioned in a hollow portion of the screw.

22. A joint press, comprising:

a yoke including a first end, a second end, a first opening located on the first end and a second opening located on the second end;

a first attachment member located on the first end, wherein the first attachment member comprises a ball joint pressure pad;

a screw positioned in the first opening, wherein the first attachment member is coupled to the screw, the screw being at least partially hollow, and at least a portion the first attachment member is positioned in the hollow portion of the screw;

a second attachment member located on the second end; and at least one adapter that can be removably coupled to either the first attachment member or the second attachment member.

23. The joint press of claim 22, wherein the ball joint pressure pad comprises a shaft and an engagement portion.

24. The joint press of claim 23, wherein the engagement portion includes a first base, a second base, and a cylindrical sidewall.

25. The joint press of claim 24, further comprising a groove positioned on the cylindrical sidewall.

26. The joint press of claim 25, wherein the at least one adapter comprises a cylindrical member having a first end and a second end and an aperture extending from the first end to the second end, the aperture including a first portion for receiving a ball joint and a second portion for receiving the cylindrical sidewall of the ball joint pressure pad.

27. The joint press of claim 26, wherein the cylindrical member includes an interior surface exposed by the aperture, the adapter further comprising a complementary groove positioned on the interior surface and a snap-ring positioned in the complementary groove, wherein the snap-ring is configured to fit into the groove on the cylindrical sidewall of the ball joint pressure pad when the adapter and the first attachment member are mated.

28. The joint press of claim 19 wherein the second attachment member comprises a shaft including a first end and a second end, wherein the first end is positioned in the second opening and the second end extends opposite the first attachment member.

29. The joint press of claim 28, wherein the shaft is at least partially hollow.

30. The joint press of claim 28, wherein the second end of the shaft includes a groove positioned thereon.

31. A joint press, comprising:

a yoke including a first end, a second end, a first opening located on the first end and a second opening located on the second end;

a first attachment member located on the first end;

a second attachment member located on the second end of the yoke, the second attachment member comprising a shaft including a first end and a second end, wherein the first end is positioned in the second opening, and the second end extends opposite the first attachment member and includes a groove positioned thereon; and at least one adapter that can be removably coupled to either the first attachment member or the second attachment member, wherein the at least one adapter comprises a cylindrical member having a first end and a second end and an aperture extending from the first end to the second end, the aperture including a first portion for receiving a ball joint and a second portion for receiving the second end of the shaft.

32. The joint press of claim 31, wherein the cylindrical member includes an interior surface exposed by the aperture, the at least one adapter further comprising a complementary groove positioned on the interior surface and a snap-ring positioned in the complementary groove, the snap ring adapted to fit into the groove on the second end of the shaft when the adapter and the second attachment member are mated.

33. The joint press of claim 15, wherein the at least one adapter comprises a first adapter that can be removably coupled to either the first attachment member or the second attachment member and a second adapter that can be removably coupled to the first attachment member, or to the second attachment member, or to the first adapter.

34. A joint press, comprising:

a yoke including a first end and a second end;

a first adapter attachment member positioned on the on the first end;

a second adapter attachment member positioned on the second end; and a plurality of adapters each having a first end configured to receive a joint and a second end that is configured to be attached selectively to each of the first attachment member and the second attachment member.

35. The joint press of claim 34, wherein each of the plurality of adapters comprises a cylindrical member having a first end and a second end and an aperture extending from the first end to the second end, the aperture including a ball joint receiving portion, an attachment member receiving portion, and a through portion in communication with both the ball joint receiving portion and the attachment member receiving portion.

36. The joint press of claim 35, wherein the through portion is cylindrical.

37. The joint press of claim 36, wherein the through portion diameter is 1.25 inches.

38. A joint press, comprising:

a yoke including a first end and a second end;

a first adapter attachment member positioned on the on the first end;

a second adapter attachment member positioned on the second end; and a plurality of adapters each having a first end adapted to receive a joint and a second end that is adapted to be attached to selectively to each of the first attachment member and the second attachment member, wherein each of the plurality of adapters comprises a cylindrical member having a first end and a second end and an aperture extending from the first end to the second end, the aperture including a ball joint receiving portion, an attachment member receiving portion, and a through portion in communication with both the ball joint receiving portion and the attachment member receiving portion, wherein the plurality of adapters comprises a first adapter, a second adapter, a third adapter, a fourth adapter, a fifth adapter and a sixth adapter.

39. The joint press of claim 38, wherein the ball joint receiving portion of each adapter is cylindrical.

40. The joint press of claim 39, wherein the ball joint receiving portion of the first adapter has a diameter of 1.68 inches.

41. The joint press of claim 40, wherein the ball joint receiving portion of the second adapter has a diameter of 1.775 inches.

42. The joint press of claim 41, wherein the ball joint receiving portion of the third adapter has a diameter of 2.01 inches.

43. The joint press of claim 42, wherein the ball joint receiving portion of the fourth adapter has a diameter of 2.25 inches.

44. The joint press of claim 43, wherein the ball joint receiving portion of the fifth adapter has a diameter of 2.425 inches.

45. The joint press of claim 43, wherein the ball joint receiving portion of the sixth adapter has a diameter of 2.68 inches.

46. The joint press of claim 38, further comprising a seventh adapter.

* * * * *